United States Patent Office 3,519,587
Patented July 7, 1970

3,519,587
PRESSURE SENSITIVE ADHESIVES OF VINYL
ACETATE/VINYL LAURATE COPOLYMERS
Hubert Wiest, Joseph Heckmaier, and Eduard Bergmeister, Burghausen, Upper Bavaria, Germany, assignors to Wacker-Chemie G.m.b.H., Munich, Bavaria, Germany, a corporation of Germany
No Drawing. Filed Oct. 23, 1967, Ser. No. 677,023
Claims priority, application Germany, Oct. 31, 1966, W 42,704
Int. Cl. C09j 3/14; C08f 45/52
U.S. Cl. 260—28.5     2 Claims

ABSTRACT OF THE DISCLOSURE

This invention relates to pressure sensitive adhesives, i.e. substances which are also called "sticky adhesive substances," "dry sticky adhesives," "self-adhesive, substances" or "stick-on adhesives," and in English language literature mostly "pressure sensitive adhesives."

Such substances are used on a large scale as adhesive layers on various bases, particularly on tapes or other flat bases, e.g. medical adhesive tapes, insulating tapes for electrical devices, self-adhesive tapes for other purposes, self-adhesive labels or self-adhesive foils, or for instance for sealing envelopes and bags.

BACKGROUND OF THE INVENTION

The pressure sensitive adhesives used up to now have mainly been substances such as natural or synthetic rubber, copolymerizates of vinyl acetate and ethylene and/or polyvinyl ethers and sticky resins like terpene phenol-, cumarone-indene-, organopolysiloxane- and ethoxyline resins or colophony. Also, homo- or copolymerizates of acrylic acid esters have frequently been used as pressure sensitive adhesives.

The pressure sensitive adhesives hitherto known have been applied to their carrier bases mostly in the form of their solutions in organic solvents. However, the use of solutions employing organic solvents presents drawbacks. Among such drawbacks are the danger to health, and the combustibility. The latter danger applies particularly when the carrier substances to which the adhesive is to be applied consist of plastic materials, since sparks can easily be created by an electrostatic charge. It is a special disadvantage that, due to the time required for the evaporation of the solvents, the limit of the production speed of the pressure sensitive adhesive products is intolerably low. Another disadvantage, for instance, is the expense involved in removing the solvents, and their recovery.

It is true that some of the drawbacks referred to above do not occur when using aqueous dispersions in whose form pressure sensitive adhesives have likewise been applied to the carrier bases. However, the removal of the water is even more expensive than the removal of solvents and it is even more time-consuming.

The above-described drawbacks do not all occur when pressure sensitive adhesives are applied from the fused mass (melt) to the carrier bases. However, the heat stability of the pressure sensitive adhesives known up to now is not sufficient to enable one to process them in the form of melts, and/or they result in melts which are very highly viscous. Not all applicator devices for melts are suitable for processing such highly viscous melts; and special applicator devices like wormgear presses with wide slot nozzles must be used for these. However, the use of wormgear presses for processing pressure sensitive adhesives has the drawback that the separate particles or pieces of the pressure sensitive adhesive must be wrapped for protection, e.g. with foils or adhesive-repellant covers, because they are otherwise too sticky for introducing them in solid form into the wormgear presses. Also, with very highly viscous melts it is difficult to achieve the frequently required thin adhesive layer thickness of 10 to 30 microns and the likewise required uniformity of the adhesive layer thickness.

SUMMARY OF THE INVENTION

The object of the present invention is to provide pressure sensitive adhesives which can be applied to the carrier bases in the form of melts and which do not have the drawbacks described above. The pressure sensitive adhesives of our invention, in melted condition, exhibit low viscosity, i.e. they have a low melting viscosity and have outstanding thermal stability, good cohesion and good adhesive properties.

The pressure sensitive adhesives of the invention, based on polymerizates which can be applied to the carrier bases in the form of melts, are characterized by the fact that they contain as essential components copolymerizates of 35 to 65 weight percent vinyl acetate and 65 to 35 weight percent vinyl laurate with a $k$-value of 35 to 65 and 2 to 10 weight percent, referred to the weight of the copolymerizates of vinyl acetate and vinyl laurate, of waxes. The $k$-value is a measure of the degree of polymerization (see H. Fikentscher in "Cellulose Chemistry," vol. 13, 1932, page 58).

The copolymerizates of 35 to 65 weight percent vinyl acetate and 65 to 35 weight percent vinyl laurate used according to our invention are available particularly by substance polymerization (frequently also termed "block polymerization") or by solvent polymerization of mixtures of the monomers mentioned, in each case by means of monomer-soluble radical formers as catalysts, in the known manner. Examples of radical formers which can be used for making the copolymerizates used according to the invention are azodiisobutyric acid nitrile, benzoyl peroxide, lauryl peroxide, tert.-butyl perpivalate and diisopropyl percarbonate. Examples of solvents which can be used for making the copolymerizates used according to the invention by solution polymerization are hydrocarbons like toluene, aliphatic alcohols like isopropanol and tert.-butanol, also esters like ethyl acetate. In order to facilitate obtaining the desired $k$-value of the polymerizates one can, if necessary, use regulators in addition during the polymerization. Examples of such regulators are acetaldehyde, propionic aldehyde and dodecyl mercaptan. One can use mixtures of various kinds of copolymerizates of vinyl acetate and vinyl laurate, where differences can consist of different proportions of vinyl acetate and vinyl laurate and/or in the $k$-value.

For waxes we use in the adhesives of the invention preferably those whose melting point is between 50° and 120° C. These are well-known substances that occur in nature, altered natural products, or synthetic products. Examples of waves are natural waxes like mineral waxes such as ozokerite and montan waxes, plant waxes like carnauba wax, candelilla wax, ouricury wax and esparto wax, as well as animal waxes like beeswax and spermaceti wax, chemically treated natural waxes like acid waxes, ester waxes and partially saponified ester waxes, and chemical waxes like paraffin waxes, microcrystalline waxes, polyethylene waxes and polyvinyl octadecyl ether.

DESCRIPTION OF THE PREFERRED EMBODIMENTS

Particularly preferred in our novel adhesives are acid waxes, ester waxes, and partially saponified ester waxes. These are products which consist mainly of montainic acid ($C_{27}H_{55}COOH$) and esters of this acid with glycols as well as mixtures of metal soaps of this acid and glycol esters of said acid. Particularly good results are obtained with products which are commercially available under the names "Hoechst-Wachs L," "Hoechst-Wachs O," "Hoechst-Wachs OP," "Hoechst-Wachs E" and "Hoechst-Wachs F." (The term "Hoechst" in these names is a registered trademark in each case.) Mixtures of various waxes can be used.

The adhesives of our invention may contain in addition to the essential components, i.e. copolymerizates of vinyl acetate and vinyl laurate of the kind described above and of waxes, softeners that are usually employed in vinyl polymerizates. Preferred as softeners are polymeric softeners like polyester of adipic acid and polyvalent alcohols, because of their low vapor pressure. However, if desired, one can use other softeners like dibutyl phthalate and di - 2 - ethylhexyl phthalate, instead of or in admixture with polymer softeners. Moreover, our adhesives can contain inorganic and/or organic fillers which are known as useable in adhesives, particularly when thicker adhesive layers are desired, e.g. 100 g./m.$^2$. Examples of such fillers are chalk, light spar, i.e. pure white, unbaked powdered gypsum, kaolin, lampblack, diatomaceous earth and quartz flour. Also, the adhesives of our invention can contain, besides, the essential components and the above-mentioned customary non-adhesive additives in adhesives, other customary additives like heat and oxidation stabilizers, e.g. 2,2-bis-4-hydroxy phenylpropane, 2,2'-methylene-bis (4-methyl-6-tert.-butylphenol), 4,4' - dioxydiphenyl and di - beta-naphthyl-p-phenylene diamine. However, it should be noted in this connection that there are no noticeable changes in the flow- or adhesive properties of our adhesives in general, even in the absence of anti-oxidants and heat stabilizers after several hours in closed containers and coating-applying devices in resting or moving condition, e.g. during pumping, at temperatures up to 180° C.

The adhesives of our invention are made by heating the mixtures of the ingredients and stirring until a homogeneous melt is formed in any suitable known manner. If desired, part of the ingredients can be introduced first and the remainder of the ingredients can be mixed up with the first part of the ingredients during heating.

Our adhesives can be applied to the bases in the form of their melts with any suitable heatable applicator device, e.g. with rollers, doctors or pouring devices. It is possible to achieve high precision of the adhesive layer, for instance by simply applying the melt on the base from below and removing the layer with heated doctor blades down to the desired thickness of the layer. The application can be done continuously or discontinuously.

One of the most important advantages of our adhesives is that, contrary to the already known pressure sensitive adhesives, they can be processed very well and simply in the form of their melts. However, if desired, our pressure sensitive adhesives can also be used in the form of their solutions in organic solvents like gasoline, i.e. aliphatic hydrocarbons with a boiling range of 30° to 150° C., toluene, xylene, ethanol, ethyl acetate or their mixtures, or in the form of aqueous dispersions. The adhesives are thus suitable for many purposes.

The adhesives of the present invention can be applied directly to the carrier on which they will finally be used. However, the adhesives can also be applied first to an adhesive-repellent base, e.g. on paper which is coated, at least on the side to which the adhesive is to be applied, with adhesive-repellent organopolysiloxanes, and then transferred to the final carrier. As final carriers or bases for our adhesives one can use all bases which are commonly used as bases for pressure sensitive adhesives. Examples of such bases are paper, woven and unwoven textiles, metals, plastic materials like polyvinyl chloride with or without softeners, polyesters, cellulose acetate and polyethylene, particularly in the shape of tapes or foils.

The bases coated with our adhesives are self-adhesive products, i.e. they need not be moistened or heated to become adhesive, and they can be used for all purposes to which such products can be applied, as the products named above. The adhesive layer can be protected, as is customary for surfaces coated with pressure sensitive adhesives, by cover foils or cover tapes which have an adhesive repellent surface, e.g. due to impregnation with adhesive-repellent organopolysiloxanes, or by covering the back of the base with adhesive-repellent organopolysiloxanes and rolling the base up.

The bases coated with our adhesives can be removed from the objects to which they adhere without leaving any adhesive residues on the surfaces to which they adhered. The adhesive layers made with said adhesives are free from oxidation-sensitive double bonds and therefore they do not age, contrary to adhesive surfaces on rubber bases. They do not become hard and brittle, they retain their adhesive property and have a high stability.

The parts and percentages shown in the examples below refer to the weight in each case, if not otherwise indicated.

EXAMPLES FOR MAKING THE POLYMERIZATES USED ACCORDING TO THE INVENTION

Polymerizate A.—In a 4-liter flask equipped with a stirrer, thermometer, reflux condenser and a dropping funnel, after displacing the atmospheric oxygen with nitrogen, we heat a mixture of 950 g. vinyl acetate, 1000 g. vinyl laurate, 1.5 g. azodiisobutyric acid nitrile and 8 ml. propionic aldehyde, while stirring, by means of a water bath at 85° C., whereby polymerization of the monomers takes place, while vinyl acetate is recirculated. After two hours, when about 80% of the monomers have been converted, we place under continued stirring into the flask a mixture of 50 g. vinyl acetate, 0.5 g. azodiisobutyric acid nitrile and 1.5 ml. propionic aldehyde, the temperature of the retort content is increased to 100° C. and kept at this value for 30 minutes.

Polymerizate B.—In a 4-liter flask equipped with a stirrer, thermometer, reflux condenser and a dripping funnel, after displacing the atmospheric oxygen with nitrogen, we heat a mixture of 860 g. vinyl laurate, 1000 g. vinyl acetate, 1.5 g. azodiisobutyric acid nitrile and 35 ml. propionic aldehyde, while stirring, by means of a water bath at 85° C., whereby polymerization of the monomers takes place, while vinyl acetate is re-circulated. After two hours, when about 80% of the monomers have been converted, we place into the flask, under continued stirring, a mixture of 60 g. vinyl acetate, 0.5 g. azodiisobutyric acid nitrile and 2 ml. propionic aldehyde, the temperature of the flask content is increased to 100° C. and kept at this point for 30 minutes.

Polymerizate C.—In a 4-liter flask equipped with a stirrer, thermometer, reflux condenser and a drip funnel, after displacing the atmospheric oxygen with nitrogen, we heat a mixture of 580 g. vinyl laurate, 400 g. vinyl acetate, 1 g. azodiisobutyric acid nitrile, 2 ml. propionic aldehyde and 1500 g. tert.-butanol, while stirring, by means of a water bath at 85° C., whereby polymerization of the monomers takes place, while vinyl acetate is re-circulated. After two hours, when about 80% of the monomers have been converted, we place into the flask, under continued stirring, a mixture of 20 g. vinyl acetate and 0.5 g. azodiisobutyric acid nitrile, the temperature of the flask content is increased to 100° C. and kept at this point for 30 minutes. Finally, the tert.-butanol is distilled off.

The values shown for the stability of the adhesiveness in the following examples were determined in each case in accordance with the PSTC Method No. 2 (see TAPPI Monograph Series No. 26, page 45) by measuring the standing time on a polyvinyl chloride film coated with 17 g./m.$^2$ of adhesive, under a load of 500 g. per each 8 cm.$^2$ of pasted surface.

Example 1

100 parts of the polymerizate A, i.e. of a copolymerizate of 50% vinyl acetate and 50% vinyl laurate with a k-value of 48 and a melting viscosity of 18,000 cp./160° C. are heated under stirring together with 7 parts of an acid wax (characteristics: melting point, 80 to 83° C.; solidification point, ° C. as per German Industry Standards 51,556, 76 to 79; acid number, 125 to 145; saponification number, 150 to 170; ester number, 25; non-saponifiable substances, 7 to 10%; spec. weight at 20° C., 0.99 to 1.00) to 120° C. until a homogeneous melt is formed.

The melting viscosity of the pressure sensitive adhesive obtained in this manner is 10,000 cp./160° C. The stability of the adhesions made with it is 120 minutes.

Without the addition of wax the melting viscosity of polymerizate A, as mentioned above, is 18,000 cp./160° C., the stability of the adhesions made with it is only 50 minutes; frequently paper, cellulose acetate, wood, glass or polyvinyl chloride tissue coated with it cannot be removed from the objects to which it adheres without leaving traces of adhesive clinging to the objects, while the same carrier bases which are coated with the mixture of polymerizate A and wax described above can be removed from the objects to which they have been sticking without leaving any residues of the adhesive on the objects.

Example 2

100 parts of polymerizate A are heated under stirring together with 7 parts of the acid wax described in Example 1 and 5 parts of a polyadipate with a softening point of about 30° C. acting as a polymer softener (see H. Gnamm and W. Sommer, Solvents and Softeners, Stuttgart 1958, page 710) to 120° C., until a homogeneous melt is formed.

The melting viscosity of the adhesive obtained in this manner is 7,000 cp./160° C. The stability of adhesions made with it is 90 minutes. To determine the peeling stability of the adhesions, 2.5 cm. wide strips of polyvinyl chloride films are coated with a melt of the adhesive, and the adhesive tapes obtained in this manner, after cooling to room temperature, are applied to smooth red beech wood or to glass with a pressure roller as per TAPPI Monograph Series No. 26, without any further pressure. After 30 seconds at 20° C., or after 24 hours at 20° C., or after 7 days at 70° C., the adhesive strips are peeled off with a testing machine at an angle of 180° at a speed of 30 cm./minute, i.e. they are removed again. The peeling stability in kg./2.5 cm. amounts to:

| On | After 30 sec./20° C. | After 24 hours/ 20° C. | After 7 days/ 70° C. |
|---|---|---|---|
| Wood | 0.5 | 1.2 | 1.6 |
| Glass | 0.5 | 1.1 | 1.6 |

The adhesive tapes made as described above adhere to paper so strongly that the paper is destroyed during removal of the adhesive tapes.

Example 3

100 parts of polymerizate B, i.e. of a copolymerizate of 57% vinyl acetate and 43% vinyl laurate with a k-value of 37 and a melting viscosity of 5000 cp./160° C. are heated together with 2 parts of a synthetic hard paraffin wax (characteristics: solidifying point, 90 to 94° C.; penetration number (100 g./5"/25° C.), 3 to 5; acid number, 0; saponification number, below 0.5) which is micro-crystalline, to 120° C. until a homogeneous melt is formed.

The melting viscosity of the pressure sensitive adhesive obtained in this manner is 2000 cp./160° C. The stability of the adhesions made with it is 55 minutes. The peeling stability, determined as described in Example 2, is in kg./2.5 cm.:

| On | After 30 sec./20° C. | After 24 hours/ 20° C. | After 7 days/ 70° C. |
|---|---|---|---|
| Wood | 0.4 | 2.0 | 2.2 |
| Glass | 0.4 | 2.0 | 2.2 |

Without adding the wax, the melting viscosity of polymerizate B, as mentioned above, is 5000 cp./160° C. and the stability of the adhesions made with it is only 30 minutes. The peeling stability is practically the same.

Example 4

100 parts of the polymerizate C, i.e. of a copolymerizate of 58% vinyl laurate and 42% vinyl acetate with the k-value 56, are heated under stirring together with 6 parts of a partially saponified ester wax (characteristics: dripping point as per Ubbelohde, 100 to 104° C.; solidification point, 73 to 76; acid number, 10 to 15; saponification number, 105–120; esterification number, 95 to 105; non-saponifiable substances, 7–10; spec. weight at 20° C., 1.03 to 1.04) at 120° C. until a homogeneous melt is formed.

The pressure sensitive adhesive obtained in this manner yields a melt which at 140° to 190° C. can be applied very easily to the carrier surfaces to be coated, which results in adhesive layers with outstanding properties.

The invention claimed is:

1. Pressure sensitive adhesives adapted to be applied to carrier surfaces in the form of melts, which contain as essential ingredients copolymerizates of 35 to 65 weight percent vinyl acetate and 65 to 35 weight percent vinyl laurate with a k-value of 35 to 65, and 2 to 10 weight percent, referred to the weight of the copolymerizates of vinyl acetate and vinyl laurate, of waxes.

2. Adhesives according to claim 1, containing a polymeric softener.

References Cited

UNITED STATES PATENTS

| 2,066,075 | 12/1936 | Reppe | 260—106 |
| 2,156,093 | 4/1939 | Lange | 260—498 |

OTHER REFERENCES

Skeist: "Handbook of Adhesives," Reinhold Pub., 1962, pages 352–368.

MORRIS LIEBMAN, Primary Examiner

P. R. MICHL, Assistant Examiner

U.S. Cl. X.R.

260—31.6, 85.7